(12) United States Patent
Huber et al.

(10) Patent No.: US 9,328,653 B2
(45) Date of Patent: May 3, 2016

(54) INTERCOOLER

(75) Inventors: Frank Huber, Bad Waldsee (DE); Markus Sonner, Koesching (DE)

(73) Assignee: AUDI AG, Ingolstadt (DE)

( * ) Notice: Subject to any disclaimer, the term of this patent is extended or adjusted under 35 U.S.C. 154(b) by 904 days.

(21) Appl. No.: 12/500,450

(22) Filed: Jul. 9, 2009

(65) Prior Publication Data

US 2010/0050997 A1 Mar. 4, 2010

(30) Foreign Application Priority Data

Jul. 9, 2008 (DE) .......................... 10 2008 032 388

(51) Int. Cl.
*F02B 33/00* (2006.01)
*F02B 29/04* (2006.01)

(52) U.S. Cl.
CPC ......... *F02B 29/0412* (2013.01); *F02B 29/0425* (2013.01); *F02B 29/0437* (2013.01); *Y02T 10/146* (2013.01)

(58) Field of Classification Search
CPC ............. F02B 29/0412; F02B 29/0437; F02B 29/0425; Y02T 10/146
USPC ............. 123/563; 60/599, 604; 165/100, 101, 165/41, 42
See application file for complete search history.

(56) References Cited

U.S. PATENT DOCUMENTS

| | | | | |
|---|---|---|---|---|
| 1,712,892 A * | 5/1929 | Mantle | ........................... | 165/101 |
| 2,284,764 A * | 6/1942 | Parks | ........................... | 165/258 |
| 2,581,334 A * | 1/1952 | Reggio | ........................... | 123/378 |
| 3,841,395 A * | 10/1974 | Steinmann | ........................... | 165/265 |
| 4,207,848 A * | 6/1980 | Dinger et al. | ........................... | 123/556 |
| 4,918,923 A * | 4/1990 | Woollenweber et al. | ....... | 60/597 |
| 4,991,643 A * | 2/1991 | Price et al. | ........................... | 165/283 |
| 5,901,572 A * | 5/1999 | Peiffer et al. | ........................... | 62/480 |
| 6,675,579 B1 * | 1/2004 | Yang | ........................... | 60/599 |
| 6,758,266 B1 * | 7/2004 | Sjunnesson | ........................... | 165/299 |
| 7,004,154 B2 * | 2/2006 | Joyce et al. | ........................... | 123/563 |

(Continued)

FOREIGN PATENT DOCUMENTS

DE 3214205 A1 * 10/1983 .............. F02B 29/04
DE 3633405 A1 4/1988

(Continued)

OTHER PUBLICATIONS

DE3214205_MT, Rolf Eckert, Oct. 1983.*

*Primary Examiner* — Audrey K Bradley
*Assistant Examiner* — Paolo Isada
(74) *Attorney, Agent, or Firm* — Vorsys, Sater, Seymour and Pease LLP

(57) ABSTRACT

The invention relates to an intercooler for a motor vehicle with an internal combustion engine that is supercharged in steps. In this case, the intercooler has an air outlet opening as well as two air inlet openings, a heat exchanger module being associated with each air inlet opening. Air channels of the two heat exchanger modules are ultimately brought together in an air box of the intercooler, which is connected to the air outlet opening. It is thus made possible to bring together compressed charging air from two supercharging assemblies only in the area of the intercooler. To improve the pressure ratios during operation of only one supercharging assembly, a non-return valve is provided in an air channel. Thus, a module for separately bringing the airways together can be eliminated, thereby reducing the installation space requirement.

6 Claims, 1 Drawing Sheet

(56) References Cited

U.S. PATENT DOCUMENTS

| | | | |
|---|---|---|---|
| 7,168,419 B2 * | 1/2007 | Rosin et al. | 123/568.12 |
| 7,290,593 B2 * | 11/2007 | Kolb | 165/41 |
| 7,300,494 B2 * | 11/2007 | Schwalm et al. | 95/54 |
| 7,461,641 B1 * | 12/2008 | Styles et al. | 123/568.12 |
| 2002/0144803 A1 * | 10/2002 | Worner | F01N 1/086 165/96 |
| 2003/0217833 A1 * | 11/2003 | Alber et al. | 165/42 |
| 2006/0060347 A1 * | 3/2006 | Moser et al. | 165/297 |
| 2007/0017489 A1 * | 1/2007 | Kuroki | F02M 25/0754 123/568.12 |
| 2009/0084364 A1 * | 4/2009 | Martins et al. | 123/563 |

FOREIGN PATENT DOCUMENTS

| | | | |
|---|---|---|---|
| DE | 10209002 A1 | 9/2003 | |
| DE | 102004049027 A1 | 4/2006 | |
| EP | 1640594 A1 | 3/2006 | |
| WO | 2004017006 A2 | 2/2004 | |
| WO | WO 2004044402 A1 * | 5/2004 | F02B 29/04 |
| WO | WO 2005116414 A1 * | 12/2005 | F02B 29/0412 |
| WO | WO2007035972 A2 | 4/2007 | |

* cited by examiner

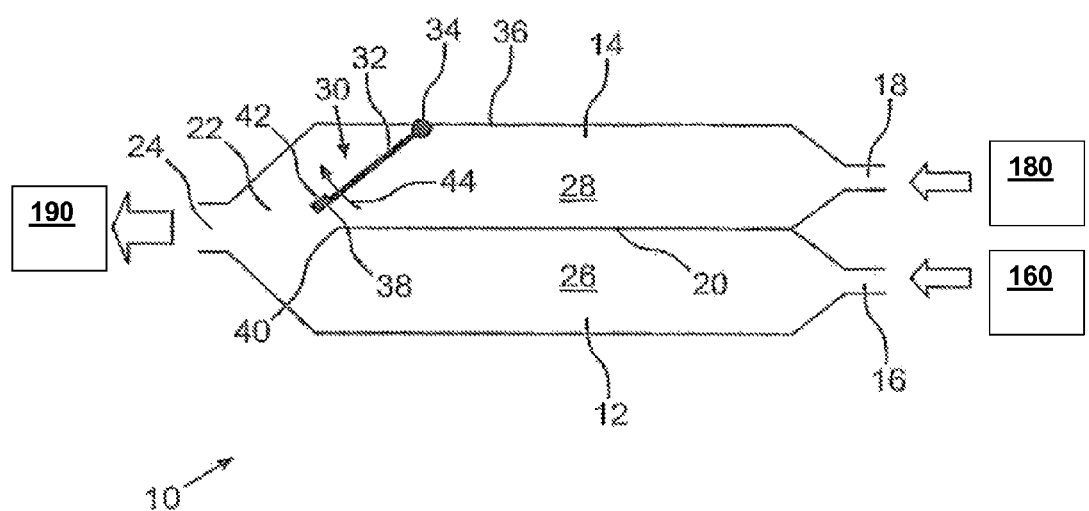

INTERCOOLER

The invention relates to an intercooler for a motor vehicle as well as a motor vehicle with such an intercooler.

BACKGROUND OF THE INVENTION

The known intercoolers for motor vehicles are used to cool the combustion air that is compressed by a supercharging assembly—such as, for example, a compressor or turbocharger—in order to further increase its air density. A larger air mass can thus be fed to the engine, as a result of which a greater amount of fuel can be injected, which increases the output of the engine.

Intercoolers usually have a heat exchanger module through which charging air flows. At a network structure of the heat exchanger module, this charging air releases its heat into the ambient air. In many cases, liquid-cooled heat exchanger modules are also used for intercoolers.

If exhaust-gas turbochargers are used as supercharging assemblies, their compression efficiency depends greatly on the respective operating state of the motor vehicle. To improve the compression, a so-called step-by-step supercharging is therefore used to an increasing extent, i.e., the compression of the charging air is ensured by two supercharging assemblies, which in each case are optimized in various operating states of the motor vehicle. In this case, in general one of the supercharging assemblies runs continuously, while a second assembly is turned on only under specific operating states.

If such a multi-step supercharging is used in combination with an intercooler that is known from the prior art, the compressor exhausts of the two supercharging assemblies, from which the compressed air exits, must first be brought together before the charging air can be fed to the intercooler. This disadvantageously leads to an increase in the installation space requirement. In addition, with such a design, the problem exists that the volume of the heat exchanger module of the intercooler has to be optimized for the amount of charging air that accumulates during simultaneous operation of the two supercharging assemblies. For the operation of an individual supercharging assembly, this volume is designed too large, however, which leads to a loss of power, and, in the event of load variations of the motor vehicle engine, to impaired performance.

The object of this invention is thus to provide an intercooler for a motor vehicle that overcomes the above-mentioned drawbacks in a step-by-step supercharging. In particular, the object of the invention is to provide an intercooler that is built in an especially compact manner.

SUMMARY OF THE INVENTION

The intercooler for a motor vehicle according to the invention thus comprises one air outlet opening and two air inlet openings. According to the invention, a separate heat exchanger module therefore is associated with each air inlet opening, and said module in each case comprises an air channel. These air channels in turn empty into an air box of the intercooler, which is connected to the air outlet opening. Bringing together the compressor exhausts of two supercharging assemblies thus does not take place separately from the intercooler. Rather, a separate heat exchanger module is associated with each supercharging assembly. Bringing together the air streams from the two supercharging assemblies takes place only in the direction of flow behind the heat exchanger modules in the air box of the intercooler. The installation space is thus reduced for separately bringing together the air streams of the two supercharging assemblies.

In another configuration of the invention, moreover, a closing element is provided, by means of which the air channel that is associated with a heat exchanger module can be closed. For the above-described use of an intercooler according to the invention in combination with two supercharging assemblies, one of which is in continuous operation, and a second one is turned on only intermittently, the intercooler in this case is to be connected to the supercharging assemblies so that the supercharging assembly that is operated only intermittently is connected to the air channel of the intercooler that can be closed.

If only one supercharging assembly is in operation, the closable air channel can thus be closed. As a result, the intercooler volume is significantly reduced during operation of only one supercharging assembly. Because of the smaller volume of the intercooler that is thus available, a change in the compression by the supercharging assembly is thus advantageously relayed more quickly to the engine of the motor vehicle. In load variation processes, the response behavior of the charge is thus improved.

In addition, a higher flow rate into the intercooler is achieved by the reduced cross-section in the heat exchanger module in the operation of only one supercharging assembly. This results in improved efficiency of the heat exchanger. At the same time, as a result, the pressure losses rise in the intercooler, but the higher efficiency of the heat exchanger module over-compensates for this increase.

In another configuration of the invention, the closing element can be moved from a closing position to an opening position by having a medium that enters the air channel strike it with a gas pressure. The closing element thus acts in a self-regulating manner. If the second supercharging assembly is turned on in the above-described arrangement, the gas pressure that acts in the air channel after the assembly is turned on and that is associated with this supercharging assembly is sufficient to move the closing element into its opening position. In this case, the closing element is preferably arranged so that when the second supercharging assembly is turned off, when the gas pressure thus drops again in the air channel, the closing element returns again to its closed starting position under the action of gravity alone.

To facilitate the return of the closing element into its closing position, in addition a return element can be provided that exerts on the closing element a return force that is proportional to a deflection of the closing element from the closing position. This can be achieved by, for example, a correspondingly arranged spring.

So that such a closing element can completely develop the above-mentioned advantageous properties, a sealing element is preferably associated with the closing element. Thus, in particular during operation of only one supercharging assembly, pressure losses that could develop by a partial opening of the closing element are avoided.

In a preferred embodiment, the closing element is designed as a non-return valve. This is the simplest and sturdiest design for a self-regulating closing element. In addition, the above-mentioned return element can be implemented especially simply here as a spiral spring that is arranged at the fulcrum of the non-return valve.

The closing element is preferably arranged in an exhaust area of the air channel into the air box. Thus, when the second supercharging assembly is turned on, the entire volume that is located in the associated air channel is available to said assembly for delivery during this run-up. Thus, when the second supercharging assembly is turned on, the run-up process does not follow at its surge limit, but rather is in a stable operating range.

BRIEF DESCRIPTION OF THE DRAWING

FIG. 1 is a diagrammable representative of an intercooler embodying the present invention.

DETAILED DESCRIPTION OF THE PREFERRED EMBODIMENTS OF THE INVENTION

An intercooler that is designated as a whole as 10 consists of two separate heat exchanger modules 12 and 14. Accordingly, a first air inlet opening 16 is associated with the heat exchanger module 12. In motor vehicles with a step-by-step supercharging, in which a first supercharging assembly runs continuously and a second supercharging assembly is turned on only if necessary, the first continuously-running supercharging assembly is connected to the air intake 16 of the heat exchanger module 12. The compressor exhaust of the supercharging assembly that is turned on only if necessary is connected to a second air inlet opening, 18, which is associated with the heat exchanger module 14.

A partition 20, which separates the air streams in the heat exchanger modules 12 and 14 from one another, is arranged between the heat exchanger modules 12 and 14. These air streams are brought together again only in an air box 22 of the intercooler 10 and exit via an air outlet opening 24 from the intercooler 10. The air outlet opening 24 of the intercooler 10 is connected to the air intake opening 190 of the engine of the motor vehicle. The bringing together of the compressed air streams from the compressor exhausts of the two supercharging assemblies thus takes place only after these air streams have passed the heat exchanger modules 12 and 14.

In the inner spaces 26 and 28 of the heat exchanger modules 12 and 14, in each case a so-called heat exchanger network is arranged. This network consists of a number of pipes that are connected to corrugated fins to increase the surface area of the heat exchanger, and through which flows cold ambient air or a liquid coolant. The medium that flows through the pipes of the network into the inner spaces 26 and 28 of the heat exchanger modules 12 and 14 in this case receives the heat from the charging air that flows through the network and transports it away.

A non-return valve 32 is arranged in an exhaust area 30 of the heat exchanger module 14 into the air box 22 of the intercooler 10. The latter is mounted to pivot with a hinge 34 on the wall 36 of the heat exchanger module 14. The arrangement of the intercooler 10 that is shown in the FIGURE corresponds to the actual installation. The heat exchanger module 14 is thus arranged in the vertical direction of the motor vehicle above the heat exchanger module 12. If air does not flow through the intercooler 10, the non-return valve 32 is held under the action of gravity alone in its closing position, in which it closes the inner space 28 of the heat exchanger module 14 against the air box 22. If now only the first supercharging assembly is activated, air flows through the heat exchanger module 12. As a result, a flow pressure develops in the intercooler 10 and in particular in the air box 22, which presses the lower edge 38 of the non-return valve still more tightly against the end area 40 of the partition 20 that is oriented toward the air box 22. The inner space 28 of the heat exchanger module 14 is thus sealed off in this operating state against the air box 22, so that no air supplied from the first supercharging assembly through the inner space 26 of the first heat exchanger module 12 can flow into the inner space 28 of the second heat exchanger module 14. Such an inflow would again reduce the charging-air pressure and decrease the efficiency of the system. To improve this sealing action, in addition a rotating sealing element 42 can be arranged on the non-return valve 32.

To further optimize the support of the non-return valve 32, the heat exchanger network in the inner space 28 of the second heat exchanger module 14 can be matched geometrically to the closing position of the valve, so that the non-return valve 32 is further supported by this network.

If the second supercharging assembly that runs only intermittently is turned on, a counterpressure builds up in the inner space 28 of the second heat exchanger module 14. As soon as the pressure prevailing in the air box 22 exceeds this counterpressure, the non-return valve opens in the direction of the arrow 44. Under this operating condition, the cooled charging air that is available from the two supercharging assemblies thus passes via the air box 22 and the outlet opening 24 into the air intake manifold of the associated engine. If the need for the additional charge by the second supercharging assembly ends, the pressure drops again in the inner space 28 of the second heat exchanger module 14, and the pressure that is produced by the first supercharging assembly in the air box 22 as well as the force of gravity result in a movement of the non-return valve 32 opposite to the direction of the arrow 44, until the latter again seals off the inner space 28 of the second heat exchanger module 14. To facilitate this self-regulating closing movement, a spiral spring or another such return element can be provided in the area of the hinge 34, with which the non-return valve 32 is mounted on the wall 36 of the intercooler 10.

The invention claimed is:

1. An intercooler for a motor vehicle, the intercooler comprising:
   a housing;
   a first heat exchanger;
   a second heat exchanger; and
   a valve,
   wherein the housing comprises
      a first inlet,
      a second inlet, separate from the first inlet, and
      an outlet,
      wherein the first inlet is communicable with a first supercharger,
      wherein the second inlet is communicable with a second supercharger, and
      wherein the outlet is communicable with an air intake of an engine;
   wherein the first heat exchanger is disposed in said housing,
   wherein the first heat exchanger comprises a first fluid passageway in fluid communication with said first inlet and with said outlet,
   wherein the second heat exchanger is disposed in said housing,
   wherein the second heat exchanger comprises a second fluid passageway in fluid communication with said second inlet and with the outlet,
   wherein the valve is disposed in said second passageway,
   wherein the valve is displaceable between open and closed positions.

2. An intercooler according to claim 1 wherein said valve comprises a flap valve.

3. An intercooler according to claim 2 wherein said valve is biased in a closed position.

4. An intercooler according to claim 2 wherein upon non-operation of said second supercharger and operation of said first supercharger, fluid under pressure in said first mentioned passageway functions to bias said valve in said closed position.

5. An intercooler according to claim 4 wherein said valve is gravity biased in the closed position.

6. An intercooler according to claim 1 wherein said valve is gravity biased toward a closed position.

\* \* \* \* \*